(12) United States Patent
Lee et al.

(10) Patent No.: US 10,795,190 B2
(45) Date of Patent: Oct. 6, 2020

(54) INPUT SENSING UNIT AND DISPLAY DEVICE INCLUDING THE INPUT SENSING UNIT

(71) Applicant: Samsung Display Co., Ltd., Yongin-si, Gyeonggi-do (KR)

(72) Inventors: In Nam Lee, Yongin-si (KR); Kyo Won Ku, Yongin-si (KR); Mi Young Kim, Yongin-si (KR); Chang Bum Kim, Yongin-si (KR); Hyun Jae Lee, Yongin-si (KR)

(73) Assignee: Samsung Display Co., Ltd. (KR)

( * ) Notice: Subject to any disclaimer, the term of this patent is extended or adjusted under 35 U.S.C. 154(b) by 186 days.

(21) Appl. No.: 16/012,466

(22) Filed: Jun. 19, 2018

(65) Prior Publication Data

US 2019/0187496 A1     Jun. 20, 2019

(30) Foreign Application Priority Data

Dec. 19, 2017  (KR) .................. 10-2017-0175230

(51) Int. Cl.
  *G02F 1/13*     (2006.01)
  *G02F 1/1337*   (2006.01)
  (Continued)

(52) U.S. Cl.
  CPC .......... *G02F 1/1309* (2013.01); *G02F 1/1337* (2013.01); *G02F 1/134309* (2013.01);
  (Continued)

(58) Field of Classification Search
  CPC ..... G02F 1/00; G02F 1/01; G02F 1/13; G02F 1/1306; G02F 1/1309; G02F 1/133; G02F 1/1333; G02F 1/1343; G02F 1/134309; G02F 1/1337; G06F 3/00; G06F 3/01; G06F 3/03; G06F 3/041; G06F 3/0414; G06F 3/04142; G06F 3/04144; G06F 3/04146; G06F 3/0416; G06F 3/04164; G06F 3/0418; G06F 3/0428; G06F 3/044; G06F 3/0441; G06F 3/0442; G06F 3/0443; G06F 3/0444; G06F 3/0445; G06F 3/0446; G06F 3/0447; G06F 3/0448; G01R 27/00; G01R 27/02;
  (Continued)

(56) References Cited

U.S. PATENT DOCUMENTS 5,442,370 A * 8/1995 Yamazaki ............ G09G 3/3681
                                                    345/58
7,228,955 B2   10/2007 Jeon
  (Continued)

FOREIGN PATENT DOCUMENTS

JP    2014-021479 A    2/2014
KR    10-1090255 B1    12/2011
  (Continued)

*Primary Examiner* — Hoai-An D. Nguyen
(74) *Attorney, Agent, or Firm* — Innvation Counsel LLP (57) ABSTRACT

An input sensing unit includes sensing electrodes and auxiliary electrodes. The sensing electrodes are disposed in an input-sensing area of the input sensing unit. The auxiliary electrodes are disposed in a supplementary area and configured to sense damage occurring in an auxiliary area of the input sensing unit. The supplementary area is adjacent to the input-sensing area. The auxiliary area is part of the supplementary area.

17 Claims, 5 Drawing Sheets

(51) Int. Cl.
  *G02F 1/1343*  (2006.01)
  *G06F 3/041*  (2006.01)
  *G06F 3/044*  (2006.01)

(52) U.S. Cl.
  CPC .......... *G06F 3/0418* (2013.01); *G06F 3/0443* (2019.05); *G06F 3/0446* (2019.05); *G06F 3/0448* (2019.05); *G06F 3/04164* (2019.05)

(58) Field of Classification Search
  CPC .... G01R 27/026; G01R 27/2605; G01D 5/00; G01D 5/12; G01D 5/14; G01D 5/24; G01D 5/241; G01D 5/2412; G01D 5/2417
  USPC .......... 324/500, 537, 760.01, 600, 649, 658, 324/660, 661, 686; 345/156, 173, 174
  See application file for complete search history.

(56) References Cited

U.S. PATENT DOCUMENTS

| | | | |
|---|---|---|---|
| 9,746,880 B2 | 8/2017 | Kim | |
| 2015/0277643 A1* | 10/2015 | Kim | G06F 1/1626 |
| | | | 345/173 |
| 2016/0370613 A1 | 12/2016 | Li et al. | |

FOREIGN PATENT DOCUMENTS

| | | |
|---|---|---|
| KR | 10-2015-0108644 A | 9/2015 |
| KR | 10-2015-0114195 A | 10/2015 |
| KR | 10-2016-0019954 A | 2/2016 |
| KR | 10-2016-0125691 A | 11/2016 |

\* cited by examiner

INPUT SENSING UNIT AND DISPLAY DEVICE INCLUDING THE INPUT SENSING UNIT

CROSS-REFERENCE TO RELATED APPLICATION

The present application claims priority to Korean patent application number 10-2017-0175230 filed on Dec. 19, 2017; the entire disclosure of the Korean patent application is incorporated herein by reference.

BACKGROUND

Field

The technical field is related to an input sensing unit and a display device including the input sensing unit.

Description of Related Art

Display devices may display images and/or information.

In addition to an image display function, a display device may include a touch sensor configured to receive and detect a touch of a user. The user may conveniently use the display device by providing user input through the touch sensor.

SUMMARY

Various embodiments are related to an input sensing unit capable of sensing damage. Various embodiments are related to a display device including the input sensing unit.

An embodiment may provide an input sensing unit including: sensing electrodes disposed in a sensing area; and auxiliary electrodes disposed in a non-sensing area adjacent to the sensing area and configured to sense damage occurring in an auxiliary area of the non-sensing area.

In an embodiment, a button unit may be disposed on the auxiliary area.

In an embodiment, the auxiliary electrodes may include a first auxiliary electrode and a second auxiliary electrode.

In an embodiment, the first auxiliary electrode and the second auxiliary electrode may be arranged in a first direction and extend in a second direction different from the first direction.

In an embodiment, the first auxiliary electrode may form an auxiliary capacitor with the second auxiliary electrode.

In an embodiment, each of the first auxiliary electrode and the second auxiliary electrode may be formed in a comb pattern.

In an embodiment, each of the first auxiliary electrode and the second auxiliary electrode may include sub-electrodes arranged in the second direction.

In an embodiment, the sub-electrodes of the first auxiliary electrode may extend in the first direction toward the second auxiliary electrode. The sub-electrodes of the second auxiliary electrode may extend in the first direction toward the first auxiliary electrode.

In an embodiment, each of the sub-electrodes may have a rectangular or a triangular shape.

In an embodiment, the first auxiliary electrode may be electrically coupled with the second auxiliary electrode.

In an embodiment, the input sensing unit may further include at least one connection electrode electrically coupling the first auxiliary electrode with the second auxiliary electrode.

In an embodiment, the at least one connection electrode may be arranged in the second direction and extend in the first direction.

In an embodiment, each of the first auxiliary electrode and the second auxiliary electrode may be formed in a zigzag pattern.

In an embodiment, the sensing electrodes and the auxiliary electrodes may be disposed on an identical layer.

In an embodiment, the sensing electrodes and the auxiliary electrodes may be disposed on different layers.

An embodiment may provide a display device including: a display panel configured to display an image; an input sensing unit disposed on the display panel; and a button unit disposed on the input sensing unit. The input sensing unit may include: sensing electrodes disposed in a sensing area; and auxiliary electrodes disposed in a non-sensing area adjacent to the sensing area and configured to sense damage occurring in an auxiliary area of the non-sensing area. The button unit may be disposed on the auxiliary area.

In an embodiment, the auxiliary electrodes may include a first auxiliary electrode and a second auxiliary electrode. The first auxiliary electrode and the second auxiliary electrode may be arranged in a first direction and extend in a second direction different from the first direction.

In an embodiment, the first auxiliary electrode may form an auxiliary capacitor with the second auxiliary electrode.

In an embodiment, the first auxiliary electrode may be electrically coupled with the second auxiliary electrode.

An embodiment may be related to an input sensing unit. The input sensing unit may include sensing electrodes and auxiliary electrodes. The sensing electrodes may be disposed in an input-sensing area of the input sensing unit. The auxiliary electrodes may be disposed in a supplementary area and may sense damage occurring in an auxiliary area of the input sensing unit. The supplementary area may be adjacent to the input-sensing area. The auxiliary area may be part of the supplementary area.

The input sensing unit may include a button unit. The button unit may be disposed on the auxiliary area and may receive a press corresponding to a user command.

The auxiliary electrodes may include a first auxiliary electrode and a second auxiliary electrode. The first auxiliary electrode may be positioned between the second auxiliary electrode and the sensing electrodes The first auxiliary electrode and the second auxiliary electrode may be spaced from each other in a first direction and may be each longer in a second direction than in the first direction. The second direction may be different from the first direction.

The first auxiliary electrode may form an auxiliary capacitor with the second auxiliary electrode. A capacitance of the auxiliary capacitor may depend on a state of the auxiliary area.

Each of the first auxiliary electrode and the second auxiliary electrode may include a comb structure.

Each of the first auxiliary electrode and the second auxiliary electrode includes sub-electrodes. The sub-electrodes of the first auxiliary electrode and the sub-electrodes of the second auxiliary electrode may be alternately arranged in the second direction.

Each of the first auxiliary electrode and the second auxiliary electrode may include a base electrode that is longer in the second direction than in the first direction. The sub-electrodes of the first auxiliary electrode may be directly connected to the base electrode of the first auxiliary electrode and may protrude toward the second auxiliary electrode. The sub-electrodes of the second auxiliary electrode may be directly connected to the base electrode of the second auxiliary electrode and may protrude toward the first auxiliary electrode.

Each of the sub-electrodes may have a rectangular or a triangular shape in a plan view of the input sensing unit.

The first auxiliary electrode may be electrically connected to the second auxiliary electrode.

The input sensing unit may include at least one connection electrode electrically connecting the first auxiliary electrode to the second auxiliary electrode.

The at least one connection electrode may include connection electrodes spaced from one another in the second direction.

The connection electrode may include two zigzag structures. Each of the first auxiliary electrode and the second auxiliary electrode may overlap one of the two zigzag structures.

The input sensing unit may include an insulating layer. The sensing electrodes and the auxiliary electrodes may directly contact an identical face of the insulating layer.

The input sensing unit may include an insulating layer. The sensing electrodes may directly contact a face of the insulating layer. The auxiliary electrodes may not directly contact the face of the insulating layer.

An embodiment may be related to a display device. The display device may include a display panel configured to display an image, an input sensing unit disposed on the display panel, and a button unit disposed on the input sensing unit and configured to receive a press corresponding to a user command. The input sensing unit may include sensing electrodes and auxiliary electrodes. The sensing electrodes may be disposed in an input-sensing area of the input sensing unit. The auxiliary electrodes may be disposed in a supplementary area and may sense damage occurring in an auxiliary area of the input sensing unit. The supplementary area may be adjacent to the input-sensing area. The auxiliary area may be part of the supplementary area. The button unit may be disposed on the auxiliary area.

The auxiliary electrodes may include a first auxiliary electrode and a second auxiliary electrode spaced from each other in a first direction. Each of the first auxiliary electrode and the second auxiliary electrode may be longer in a second direction than in the first direction. The second direction may be different from the first direction.

The first auxiliary electrode may form an auxiliary capacitor with the second auxiliary electrode. A capacitance of the auxiliary capacitor may depend on a state of the auxiliary area.

The first auxiliary electrode may be electrically connected to the second auxiliary electrode.

The display device may include conductive pads electrically connected to the sensing electrodes, disposed in the supplementary area, and disposed between the first auxiliary electrode and the sensing electrodes. The first auxiliary electrode may be disposed between the second auxiliary electrode and the sensing electrode.

DETAILED DESCRIPTION

Example embodiments are described with reference to the accompanying drawings. Variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings may denote like elements.

Terms such as "first" and "second" may be used to describe various components, but they should not limit the various components. Those terms are only used for the purpose of differentiating a component from other components. For example, a first component may be referred to as a second component, and a second component may be referred to as a first component and so forth. For conciseness, the terms "first," "second," etc. may represent "first-type (or first-set)," "second-type (or second-set)," etc., respectively. The term "and/or" may include any one of or a combination of the components mentioned.

A singular noun may also represent embodiments that include a plural noun. The term "include/comprise" or "including/comprising" used in the specification may represent embodiments with one or more additional components, steps, operations, and elements.

Unless defined otherwise, all the terms used in this specification, including technical and scientific terms, have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component directly connected/coupled to another component or indirectly connected/coupled to another component through an intermediate component. On the other hand, "directly connected/directly coupled" refers to one component directly connected/coupled to another component without requiring an intermediate component.

Figure 1:
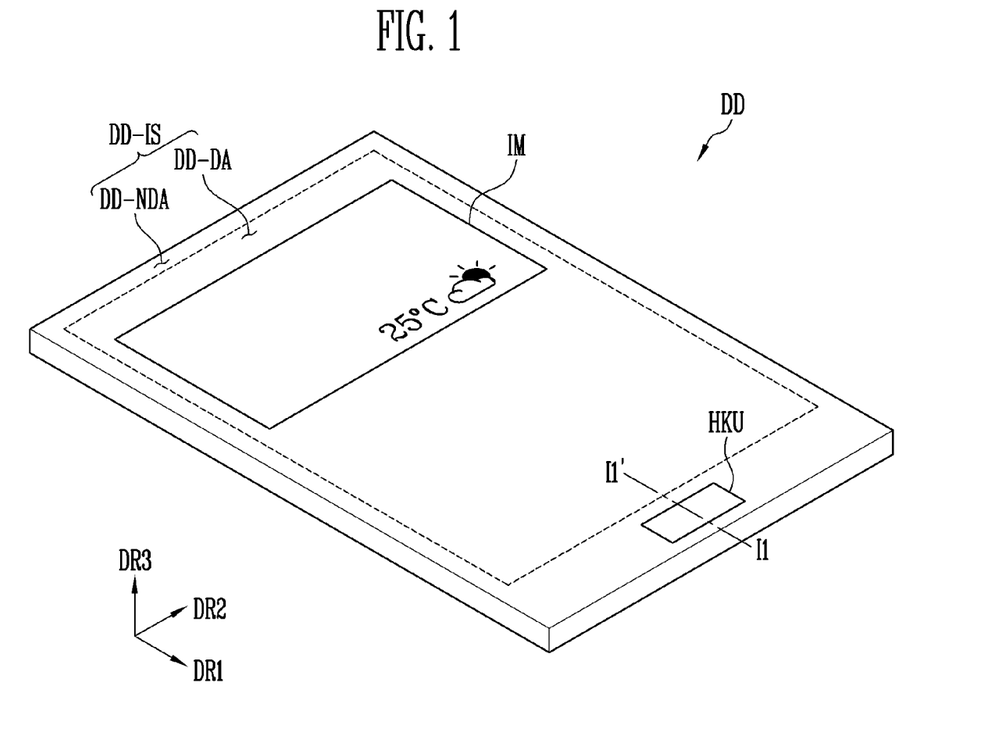
FIG. 1 is a diagram (e.g., a perspective view) illustrating a display device in accordance with an embodiment.

FIG. 1 is a diagram illustrating an electronic device in accordance with an embodiment.

Referring to FIG. 1, a display device DD may include a display surface DD-IS and a button unit HKU disposed on the display surface DD-IS.

The display surface DD-IS may be disposed on a front surface of the display device DD. The display device DD may display an image IM through the display surface DD-IS.

The display surface DD-IS is parallel to a plane defined by a first direction DR1 and a second direction DR2. A normal direction, i.e., a thickness direction relative to the display surface DD-IS of the display device DD, is indicated by a third direction DR3.

A front surface (or an upper surface) and a rear surface (or a lower surface) of each of elements or units are defined based on the third direction DR3. However, the directions DR1, DR2, and DR3 shown in the embodiments are only for examples, and directions indicated by the directions DR1, DR2, and DR3 are relative concepts and may be changed to other directions. Hereinafter, first to third directions are directions indicated by the directions DR1, DR2, and DR3, and will be designated by the same reference characters as those of the directions DR1, DR2, and DR3, respectively.

In an embodiment, the display device DD may include a curved display surface DD-IS or a three-dimensional display surface DD-IS. The three-dimensional display surface DD-IS may include a plurality of display areas oriented in respective different directions, and for example, may include a polyprism-shaped display surface.

The display device DD in according to an embodiment may be a rigid display device. The display device DD in accordance with an embodiment may be a flexible display device DD.

In embodiments, a display device which may be applied to a cellular phone terminal is used as an example of the display device DD. Although not shown, electronic modules, a camera module, a power supply module, and so forth, which are mounted on a main board, may be disposed, along with the display device DD, on/in a bracket/casing or the like to form the cellular phone terminal. The display device DD in accordance with an embodiment may be applied not only to large electronic devices such as a television and monitor, but also to small and medium devices such as a tablet PC, a vehicle navigation system, a game console, and a smartwatch.

The display surface DD-IS includes a display area DD-DA on which an image IM is displayed (and may be changed), and a non-display area DD-NDA adjacent to (and abutting) the display area DD-DA. The non-display area DD-NDA is an area on which no dynamic image is displayed. In FIG. 1, images indicating the temperature and the weather are illustrated as examples of the image IM.

As shown in FIG. 1, the display area DD-DA may be rectangular. The non-display area DD-NDA surrounds the display area DD-DA. The shape of the display area DD-DA and the shape of the non-display area DD-NDA may be configured according to particular embodiments.

The button unit HKU may be embodied with a button (e.g., a home key) of the display device DD and may receive a press or touch from a user as a user command to trigger one or more actions of the display device DD. FIG. 1 illustrates the rectangular button unit HKU. In various embodiments, the button unit HKU may have various shapes such as a triangular shape, or a circular shape.

The button unit HKU may be disposed in the non-display area DD-NDA. In various embodiments, the button unit HKU may be disposed in the display area DD-DA.

Figure 2:
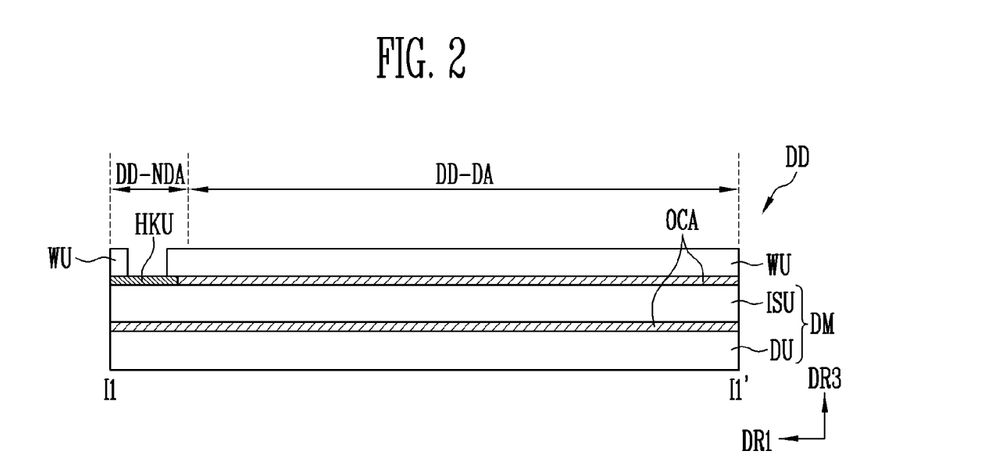
FIG. 2 is a diagram (e.g., a cross-sectional view) illustrating a cross-sectional structure of a display device in accordance with an embodiment.

FIG. 2 is a diagram illustrating a cross-sectional structure of a display device in accordance with an embodiment. FIG. 2 is a sectional view taken along line I1-I1' of FIG. 1 illustrating the display device DD.

FIG. 2 illustrates a cross section defined by the first direction DR1 and the third direction DR3. FIG. 2 is a schematic view for explaining a stacking relationship of functional panels and/or functional units that form the display device DD.

The display device DD in an embodiment may include a display unit DU, an input sensing unit ISU, and a window unit WU.

At least some components of the display unit DU, the input sensing unit ISU, and the window unit WU may be formed through a successive process, or at least some components may be coupled to each other by an adhesive member. In the example of FIG. 2, an optically clear adhesive member OCA is used as the adhesive member. The adhesive member may include a typical adhesive or a temporary adhesive. In various embodiments, the window unit WU may be replaced with other components or may be unnecessary.

In an embodiment, the input sensing unit ISU and the window unit WU may be formed with the other components through a successive process. In an embodiment, the input sensing unit ISU and the window unit WU may be coupled with the other components by an adhesive member.

The input sensing unit and the window unit may be respectively referred to as an input sensing panel and a window panel or an input sensing layer or a window layer, depending on whether a base layer is present.

Although "panel" may include a base layer, e.g., a synthetic resin film, a composite material film, or a glass substrate, for providing a base surface, "layer" may be provided without a separate base layer. In other words, each unit that may be expressed as "layer" may be disposed on a base surface provided by another unit.

In this specification, the description "component B is directly disposed on component A" mean that there is no separate adhesive layer/member between component A and component B. Component B may be formed on a base surface provided by component A through a successive process after component A has been formed.

As shown in FIG. 2, the display device DD in accordance with an embodiment may include a display unit DU, an input sensing unit ISU, a button unit HKU, and a window unit WU.

The display unit DU may generate an image. For example, the display unit DU may be a display panel capable of displaying an image. An optically clear adhesive member OCA may be disposed between the display unit DU and the input sensing unit ISU.

The display unit DU in accordance with an embodiment may be a light-emitting display panel. For example, the display unit DU may be an organic light-emitting display panel or a quantum dot light-emitting display panel. An emission layer of the organic light-emitting display panel may include organic light-emitting material. An emission layer of the quantum dot light-emitting display panel may include quantum dots and quantum rods. Hereinafter, the display unit DU will be explained as an organic light-emitting display panel.

The input sensing unit ISU may obtain coordinate information or pressure information of an external input (e.g., a touch event).

The input sensing unit ISU may be disposed on the display unit DU. In an embodiment, the input sensing unit ISU may be integrally formed with the display unit DU.

Referring to FIGS. 1 and 2, the input sensing unit ISU may completely overlap the display area DD-DA. In an embodiment, the input sensing unit ISU may only partially overlap the display area DD-DA.

The input sensing unit ISU may be a touch sensing panel configured to sense a touch of a user, or a fingerprint sensing panel configured to sense fingerprint information of the finger of the user.

In the example of FIG. 2, the input sensing unit ISU has a single layer structure. In an embodiment, the input sensing unit ISU may include a plurality of sensing layers and a plurality of insulating layers.

The button unit HKU may be disposed on the input sensing unit ISU. For example, the button unit HKU may be disposed in an area corresponding to the non-display area DD-NDA. In an embodiment, the button unit HKU may be embodied with a button of the display device DD.

The display unit DU and the input sensing unit ISU may be defined as a display module DM. Although not shown, the display module DM may further include a protective member disposed under a lower surface of the display unit DU. The protective member and the display unit DU may be coupled to each other by an adhesive member. An optically clear adhesive member OCA may be disposed between the display module DM and the window unit WU.

The window unit WU may be disposed on the display module DM and the button unit HKU. For example, an empty space (e.g., a hole) corresponding to the area in which the button unit HKU is formed may be formed in the window unit WU.

The window unit WU may include a base film and a light-shielding pattern. The base film may include a glass substrate and/or a synthetic resin film. The base film is not limited to having a single layer structure. The base film may include two or more films coupled to each other by an adhesive member.

The light-shielding pattern may partially overlap the base film. The light-shielding pattern may be disposed on a rear surface of the base film and define a bezel area, i.e., the non-display area DD-NDA, of the display device DD. The light-shielding pattern may be a colored organic layer and be formed by, e.g., a coating method. Although not shown, the window unit WU may further include a functional coating layer disposed on a front surface of the base film. The functional coating layer may include a fingerprint prevention layer, a reflection prevention layer, a hard coating layer, etc.

Figure 3:
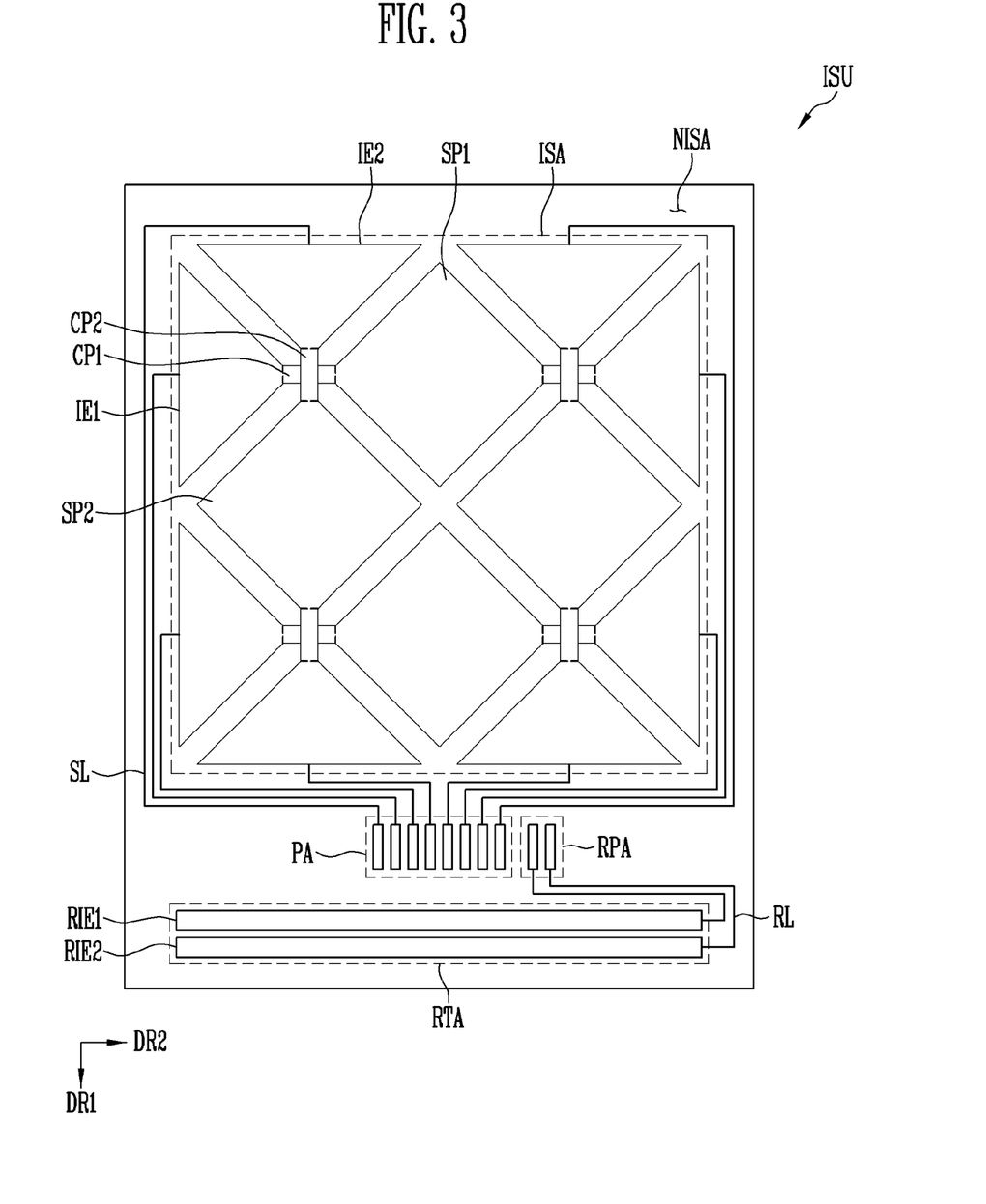
FIG. 3 is a diagram (e.g., a plan view) illustrating an input sensing unit in accordance with an embodiment.

FIG. 3 is a diagram illustrating the input sensing unit ISU in accordance with an embodiment.

Referring to FIG. 3, the input sensing unit ISU may include sensing electrodes IE1 and IE2 and sensing lines SL. Although not shown, the input sensing unit ISU may further include an optical dummy electrode disposed in a boundary area between first sensing electrodes IE1 and second sensing electrodes IE2.

The sensing electrodes IE1 and IE2 may be disposed on an input-sensing area ISA (or sensing area ISA) of a substrate of the input sensing unit ISU. Referring to FIG. 1, the sensing area ISA may be an area corresponding to the display area DD-DA. Disposed adjacent to (and abutting) the sensing area ISA, a supplementary area NISA (or non-input-sensing area NISA) of the substrate of the input sensing unit ISU may be an area corresponding to the non-display area DD-NDA.

The first sensing electrodes IE1 and the second sensing electrodes IE2 may intersect each other. The first sensing electrodes IE1 may be arranged (and spaced) in the first direction DR1, and each may extend in the second direction DR2. The second sensing electrodes IE2 may be arranged (and spaced) in the second direction DR2, and each may extend in the first direction DR1.

The first sensing electrodes IE1 and the second sensing electrodes IE2 may sense an external input in a mutual capacitance manner and/or a self capacitance manner.

Each of the first sensing electrodes IE1 may include first sensors SP1 and first connectors CP1. Each of the second sensing electrodes IE2 may include second sensors SP2 and second connectors CP2.

Among the first sensors SP1, each of two first sensors SP1 that are disposed on respective opposite ends of each first sensing electrode IE1 may have a size smaller than that of a first sensor SP1 disposed in a central portion of the first sensing electrode IE1, e.g., have a size corresponding to ½ of the first sensor SP1 disposed in the central portion.

Among the second sensors SP2, each of two second sensors SP2 that are disposed on respective opposite ends of each second sensing electrode IE2 may have a size smaller than that of a second sensor SP2 disposed in a central portion of the second sensing electrode IE2, e.g., have a size corresponding to ½ of the second sensor SP2 disposed in the central portion.

Although the first sensing electrodes IE1 and the second sensing electrodes IE2 according to an embodiment have been illustrated in FIG. 3, the shapes thereof are not limited. In an embodiment, each of the first and second sensing electrodes IE1 and IE2 may have a shape (e.g., a bar shape) without distinction between the sensor and the connector. Although the first sensors SP1 and the second sensors SP2 may have a rhombus shape, the first sensors SP1 and the second sensors SP2 may have other polygonal shapes according to particular embodiments.

In each first sensing electrode, the first sensors SP1 may be arranged in the second direction DR2. In each second sensing electrode, the second sensors SP2 may be arranged in the first direction DR1.

Each of the first connectors CP1 may (electrically and mechanically) couple the corresponding adjacent first sensors SP1 to each other. Each of the second connectors CP2 may couple the corresponding adjacent second sensors SP2 to each other.

The sensing lines SL may be electrically connected to the sensing electrodes IE1 and IE2.

The input sensing unit ISU may further include auxiliary electrodes RIE1 and RIE2 and auxiliary lines RL.

The auxiliary electrodes RIE1 and RIE2 may be disposed on the auxiliary area RTA in the supplementary area NISA. Referring to FIG. 1, the auxiliary area RTA may be an area corresponding to (and overlapping) the button unit HKU.

The auxiliary electrodes RIE1 and RIE2 may include a first auxiliary electrode RIE1 and a second auxiliary electrode RIE2.

The first auxiliary electrode RIE1 and the second auxiliary electrode RIE2 may be parallel to each other. The first auxiliary electrode RIE1 and the second auxiliary electrode RIE2 may be arranged in the first direction DR1, and each may extend (i.e., have longer dimensions) in the second direction DR2.

In the embodiment shown in FIG. 3, the first auxiliary electrode RIE1 and the second auxiliary electrode RIE2 may form an auxiliary capacitor. The capacitance of the auxiliary capacitor may depend on the state of the auxiliary area RTA, and damage to the auxiliary area RTA may change the capacitance of the auxiliary capacitor. Therefore, the first auxiliary electrode RIE1 and the second auxiliary electrode RIE2 may sense an external input and/or a state change of the auxiliary area RTA in a mutual capacitance manner and/or a self capacitance manner.

Although the first auxiliary electrode RIE1 and the second auxiliary electrode RIE2 according to an embodiment have been illustrated in FIG. 3, the shapes of the electrodes RIE1 and RIE2 may be configured according to particular embodiments.

The auxiliary lines RL may be electrically connected to the auxiliary electrodes RIE1 and RIE2.

The input sensing unit ISU may further include signal pads. The signal pads may be disposed on a pad area PA and an auxiliary pad area RPA in the supplementary area NISA adjacent to the sensing area ISA.

The signal pads may be electrically connected to the sensing lines SL and the auxiliary lines RL.

The sensing electrodes IE1 and IE2 may be disposed on at least one sensing layer included in the input sensing unit ISU.

In an embodiment, the auxiliary electrodes RIE1 and RIE2 may be disposed on (the same face of) the same layer (e.g., an insulating layer) as that of the sensing electrodes IE1 and IE2. In an embodiment, the auxiliary electrodes RIE1 and RIE2 may be formed on a layer different from that of the sensing electrodes IE1 and IE2.

In an embodiment, the pad area PA and the auxiliary pad area RPA may be adjacent to the auxiliary area RTA.

As pressure is repetitively applied to the button unit HKU, the input sensing unit ISU including the signal pads, the sensing lines SL, and the auxiliary lines RL may be damaged. For example, a crack may occur in the input sensing unit ISU.

In the input sensing unit ISU according to an embodiment, the auxiliary electrodes RIE1 and RIE2 may be disposed in the area corresponding to the button unit HKU, thus making it possible to detect damage to the input sensing unit ISU.

Figure 4A:
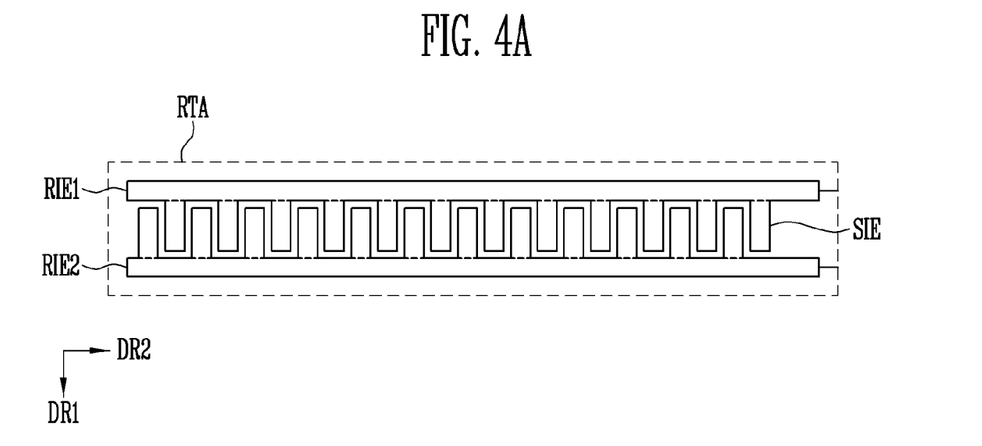
FIG. 4A is a diagram (e.g., a plan view) illustrating in detail an example of an auxiliary area shown in FIG. 3 in accordance with an embodiment.
Figure 4B:
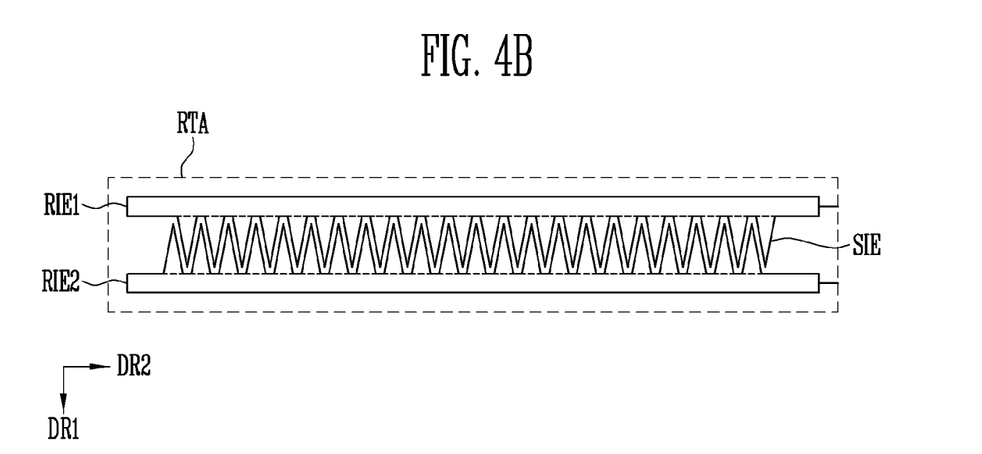
FIG. 4B is a diagram (e.g., a plan view) illustrating in detail an example of the auxiliary area shown in FIG. 3 in accordance with an embodiment.

FIG. 4A is a diagram illustrating in detail an example of the auxiliary area RTA shown in FIG. 3 in accordance with an embodiment. FIG. 4B is a diagram illustrating in detail an example of the auxiliary area RTA shown in FIG. 3 in accordance with an embodiment.

Referring to FIGS. 4A and 4B, each of the first auxiliary electrode RIE1 and the second auxiliary electrode RIE2 may be formed have a comb structure. For example, each of the first auxiliary electrode RIE1 and the second auxiliary electrode RIE2 may have sub-electrodes SIE protruding from a base electrode.

The sub-electrodes SIE may be arranged in the second direction DR2. The sub-electrodes of the first auxiliary electrode RIE1 may extend in the first direction DR1 and may protrude toward the second auxiliary electrode RIE2. The sub-electrodes of the second auxiliary electrode RIE2 may extend in the first direction DR1 and may protrude toward the first auxiliary electrode RIE1.

As shown in FIG. 4A, each of the sub-electrodes SIE may have a rectangular shape in a plan view. As shown in FIG. 4B, each of the sub-electrodes SIE may have a triangular shape in a plan view. The sub-electrodes SIE may have various shapes according to various embodiments.

Figure 5:
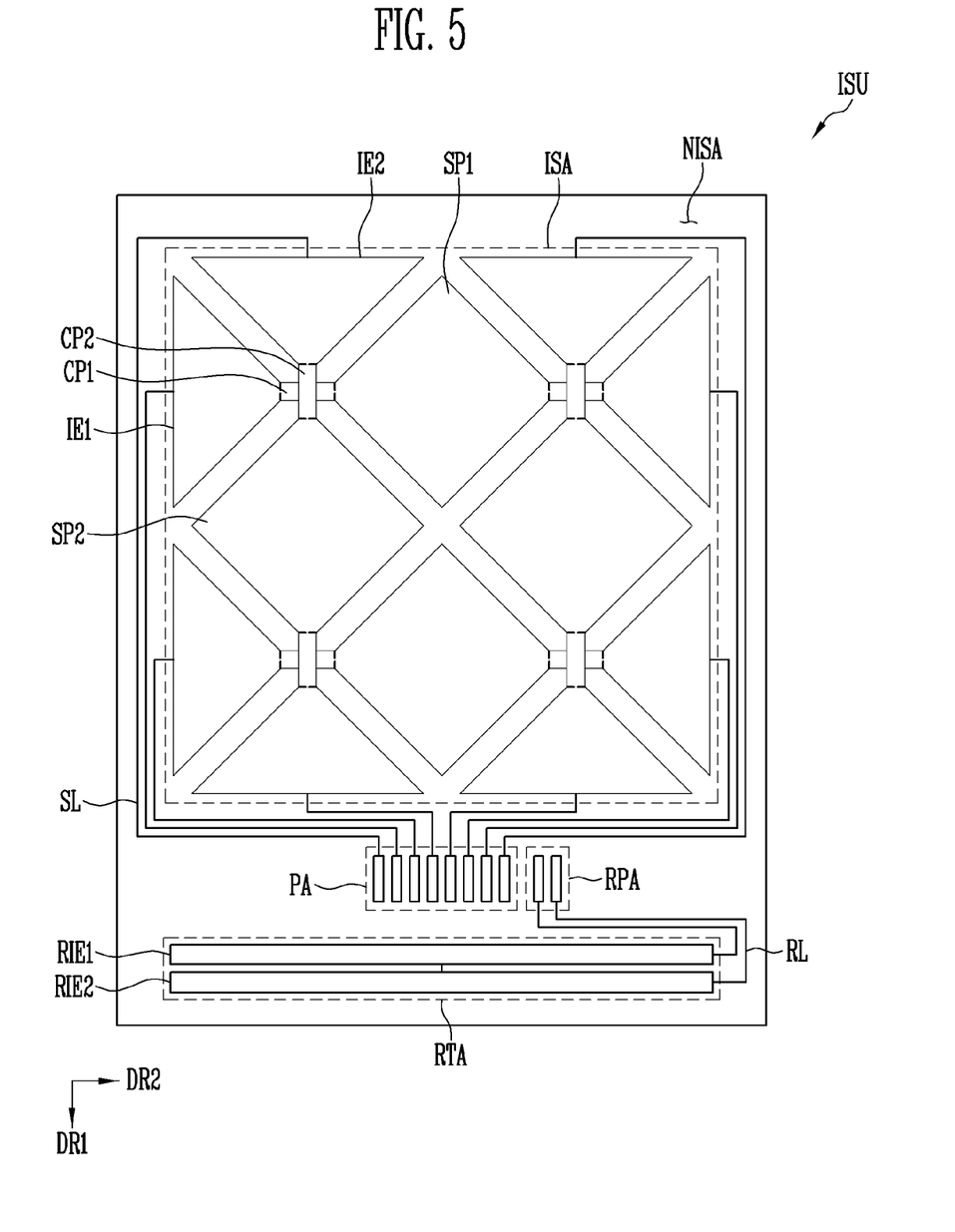
FIG. 5 is a diagram (e.g., a plan view) illustrating an input sensing unit in accordance with an embodiment.

FIG. 5 is a diagram illustrating an input sensing unit ISU in accordance with an embodiment. To avoid redundancy of explanation, descriptions of the same contents as that of FIG. 3 may not be repeated.

In an embodiment shown in FIG. 5, the first auxiliary electrode RIE1 and the second auxiliary electrode RIE2 may be electrically connected to each other, e.g., through a connector positioned between the electrodes RIE1 and RIE2 and/or a connector overlapping at least one of the electrodes RIE1 and RIE2. Therefore, the first auxiliary electrode RIE1 and the second auxiliary electrode RIE2 may sense an external input in a resistance sensing manner.

As pressure is repetitively applied to the button unit HKU, the input sensing unit ISU including the signal pads, the sensing lines SL, and the auxiliary lines RL may be damaged. For example, a crack may occur in the input sensing unit ISU.

In the input sensing unit ISU according to an embodiment, the auxiliary electrodes RIE1 and RIE2 may be disposed in the area corresponding to the button unit HKU, thus making it possible to detect damage to the input sensing unit ISU.

Figure 6A:
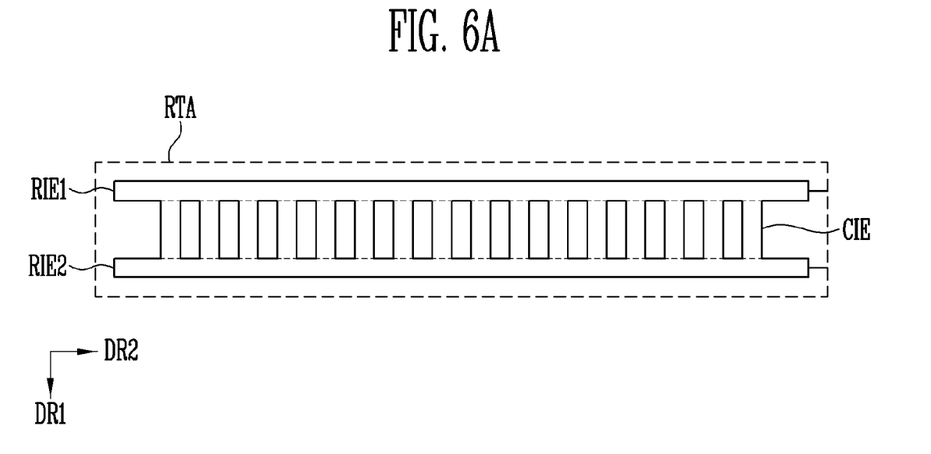
FIG. 6A is a diagram (e.g., a plan view) illustrating in detail an example of an auxiliary area shown in FIG. 5 in accordance with an embodiment.
Figure 6B:
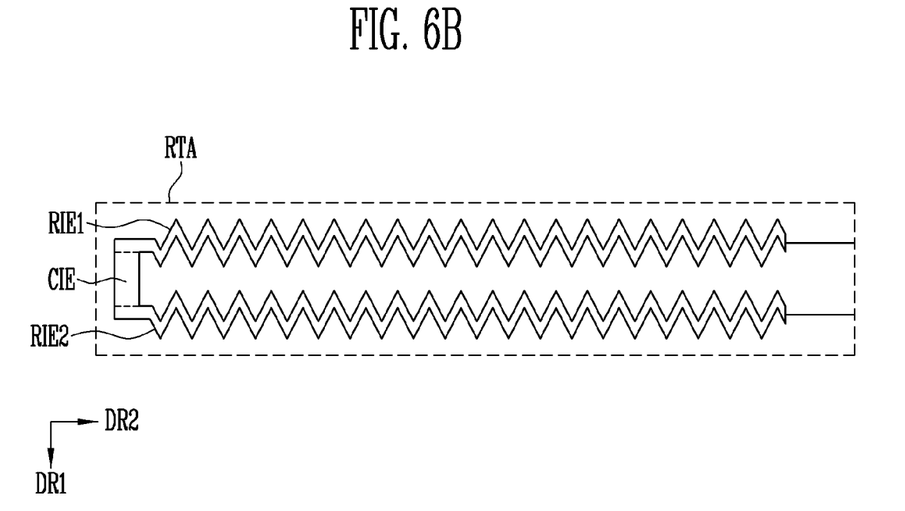
FIG. 6B is a diagram (e.g., a plan view) illustrating in detail an example of the auxiliary area shown in FIG. 5 in accordance with an embodiment.

FIG. 6A is a diagram illustrating in detail an example of the auxiliary area RTA shown in FIG. 5 in accordance with an embodiment. FIG. 6B is a diagram illustrating in detail an example of the auxiliary area RTA shown in FIG. 5 in accordance with an embodiment.

Referring to FIGS. 6A and 6B, the input sensing unit ISU (refer to FIG. 5) may further include at least one connection electrode CIE.

The at least one connection electrode CIE may electrically couple the first auxiliary electrode RIE1 to the second auxiliary electrode RIE2.

In an embodiment, connection electrodes CIE may be arranged (and spaced from each other) in the second direction DR2 and may extend in the first direction DR1.

As shown in FIG. 6A, the connection electrode CIE, the first auxiliary electrode RIE1, and the second auxiliary electrode RIE2 may form a ladder structure. As shown in FIG. 6B, the connection electrode CIE, the first auxiliary electrode RIE1, and the second auxiliary electrode RIE2 may have a zigzag. The connection electrode CIE, the first auxiliary electrode RIE1, and the second auxiliary electrode RIE2 may have various structures according to various embodiments.

Various embodiments may be related to an input sensing unit capable of sensing damage. Various embodiments may be related to a display device including the input sensing unit.

Example embodiments have been disclosed. Although specific features are described as examples, they are not for purpose of limitation. Features, characteristics, and/or elements described in connection with a particular embodiment may be used singly or in combination with features, characteristics, and/or elements described in connection with other embodiments unless otherwise specifically indicated. Various changes in form and details may be made without departing from the spirit and scope set forth in the following claims.

What is claimed is:

1. An input sensing unit comprising:
    sensing electrodes disposed in an input-sensing area of the input sensing unit; and
    auxiliary electrodes disposed in a supplementary area of the input sensing unit and configured to sense damage occurring in an auxiliary area of the input sensing unit, wherein the supplementary area is adjacent to the input-sensing area, and wherein the auxiliary area is part of the supplementary area,
    wherein the auxiliary electrodes comprise a first auxiliary electrode and a second auxiliary electrode,
    wherein the first auxiliary electrode forms an auxiliary capacitor with the second auxiliary electrode, and
    wherein a capacitance of the auxiliary capacitor depends on a state of the auxiliary area.

2. The input sensing unit of claim 1, further comprising a button unit, wherein the button unit is disposed on the auxiliary area and is configured to receive a press corresponding to a user command.

3. The input sensing unit of claim 2, wherein the first auxiliary electrode is positioned between the second auxiliary electrode and the sensing electrodes.

4. The input sensing unit of claim 3, wherein the first auxiliary electrode and the second auxiliary electrode are spaced from each other in a first direction and are each longer in a second direction than in the first direction, wherein the second direction is different from the first direction.

5. The input sensing unit of claim 4, wherein each of the first auxiliary electrode and the second auxiliary electrode includes a comb structure.

6. The input sensing unit of claim 4, wherein each of the first auxiliary electrode and the second auxiliary electrode includes sub-electrodes, and wherein the sub-electrodes of the first auxiliary electrode and the sub-electrodes of the second auxiliary electrode are alternately arranged in the second direction.

7. The input sensing unit of claim 6, wherein each of the sub-electrodes has a rectangular or a triangular shape in a plan view of the input sensing unit.

8. The input sensing unit of claim 6,
wherein each of the first auxiliary electrode and the second auxiliary electrode includes a base electrode that is longer in the second direction than in the first direction,
wherein the sub-electrodes of the first auxiliary electrode are directly connected to the base electrode of the first auxiliary electrode and protrude toward the second auxiliary electrode, and
wherein the sub-electrodes of the second auxiliary electrode are directly connected to the base electrode of the second auxiliary electrode and protrude toward the first auxiliary electrode.

9. An input sensing unit comprising:
sensing electrodes disposed in an input-sensing area of the input sensing unit; and
auxiliary electrodes disposed in a supplementary area of the input sensing unit and configured to sense damage occurring in an auxiliary area of the input sensing unit, wherein the supplementary area is adjacent to the input-sensing area, and wherein the auxiliary area is part of the supplementary area,
wherein the auxiliary electrodes comprise a first auxiliary electrode and a second auxiliary electrode, and
wherein the first auxiliary electrode is electrically connected to the second auxiliary electrode.

10. The input sensing unit of claim 9, wherein each of the first auxiliary electrode and the second auxiliary electrode is formed in a zigzag structure.

11. The input sensing unit of claim 9, further comprising at least one connection electrode electrically connecting the first auxiliary electrode to the second auxiliary electrode.

12. The input sensing unit of claim 11, wherein the first auxiliary electrode and the second auxiliary electrode are spaced from each other in a first direction and are each longer in a second direction than in the first direction,
wherein the second direction is different from the first direction, and
wherein the at least one connection electrode includes connection electrodes spaced from one another in the second direction.

13. A display device comprising:
a display panel configured to display an image;
an input sensing unit disposed on the display panel; and
a button unit disposed on the input sensing unit and configured to receive a press corresponding to a user command,
wherein the input sensing unit comprises:
sensing electrodes disposed in an input-sensing area of the input sensing unit; and
auxiliary electrodes disposed in a supplementary area of the input sensing unit and configured to sense damage occurring in an auxiliary area of the input sensing unit,
wherein the supplementary area is adjacent to the input-sensing area,
wherein the auxiliary area is part of the supplementary area,
wherein the button unit is disposed on the auxiliary area, and
wherein the button unit overlaps at least one of the auxiliary electrodes.

14. The display device of claim 13,
wherein the auxiliary electrodes comprise a first auxiliary electrode and a second auxiliary electrode spaced from each other in a first direction, and
wherein the first auxiliary electrode and the second auxiliary electrode are each longer in a second direction than in the first direction, wherein the second direction is different from the first direction.

15. The display device of claim 14, further comprising conductive pads electrically connected to the sensing electrodes, disposed in the supplementary area, and disposed between the first auxiliary electrode and the sensing electrodes, wherein the first auxiliary electrode is disposed between the second auxiliary electrode and the sensing electrode.

16. The display device of claim 14, wherein the first auxiliary electrode forms an auxiliary capacitor with the second auxiliary electrode, and wherein a capacitance of the auxiliary capacitor depends on a state of the auxiliary area.

17. The display device of claim 14, wherein the first auxiliary electrode is electrically connected to the second auxiliary electrode.

\* \* \* \* \*